March 28, 1944. W. B. FAGEOL 2,344,983
VEHICLE SPRING SUSPENSION
Filed Dec. 28, 1940 7 Sheets-Sheet 1
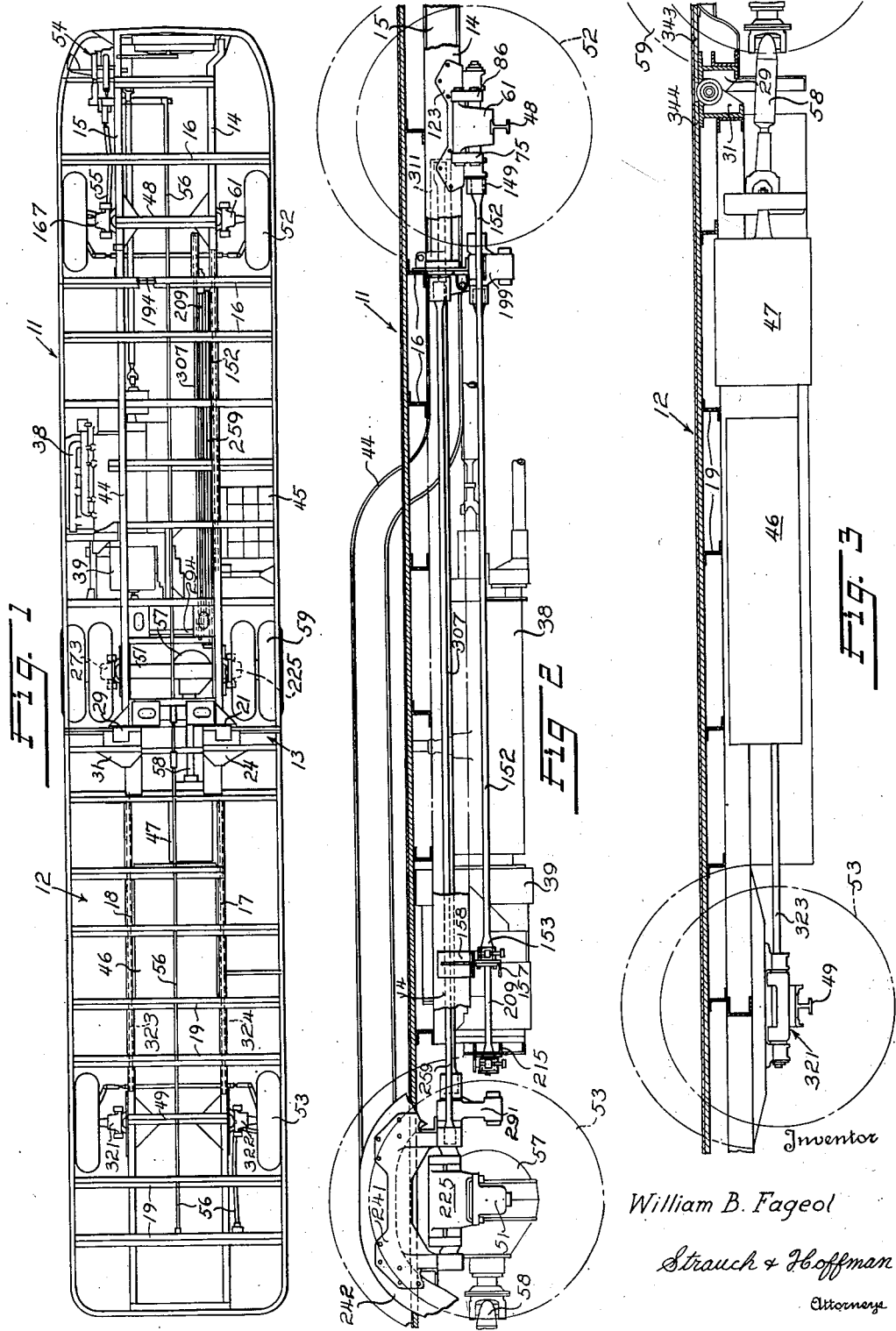
Inventor
William B. Fageol
Strauch & Hoffman
Attorneys

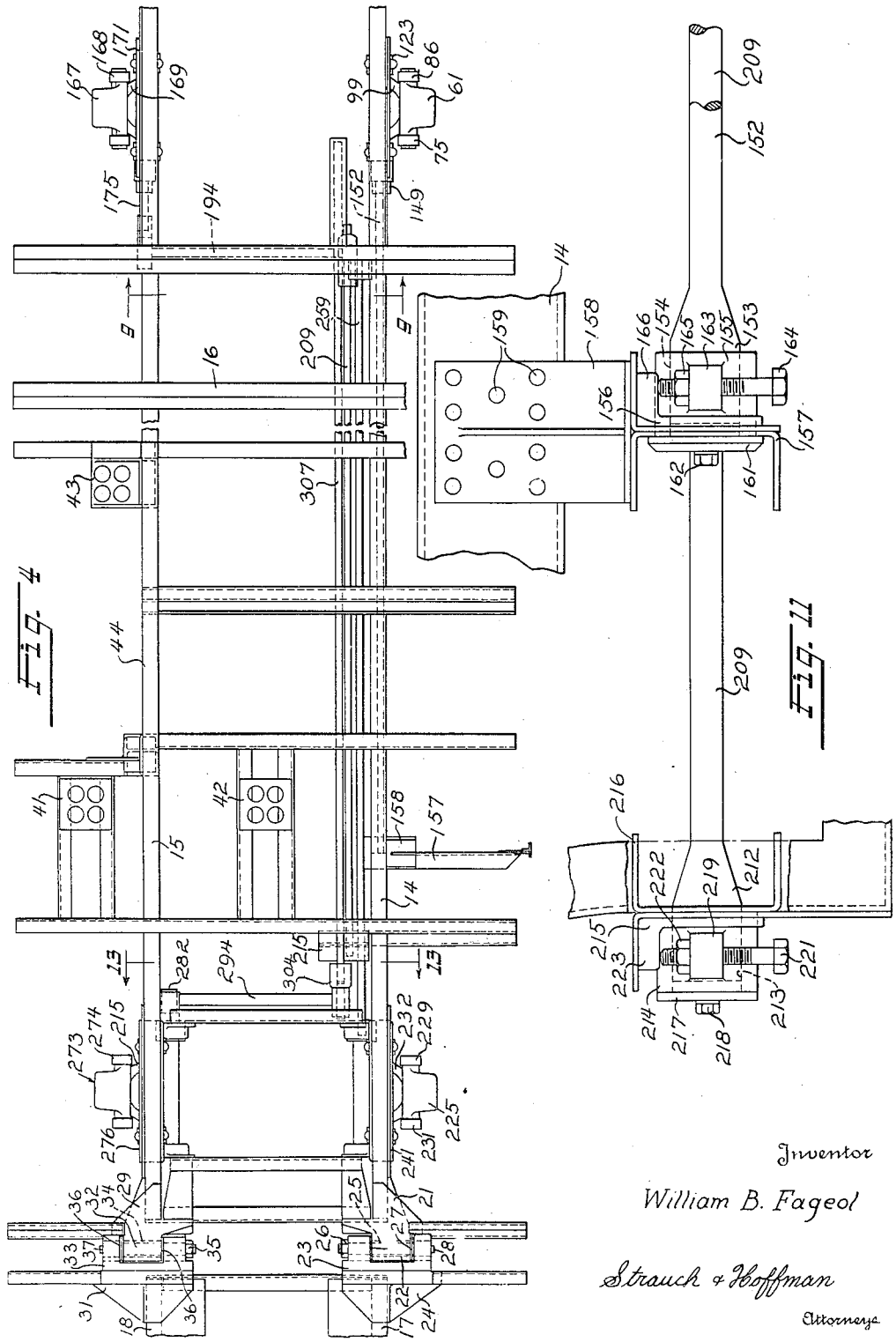

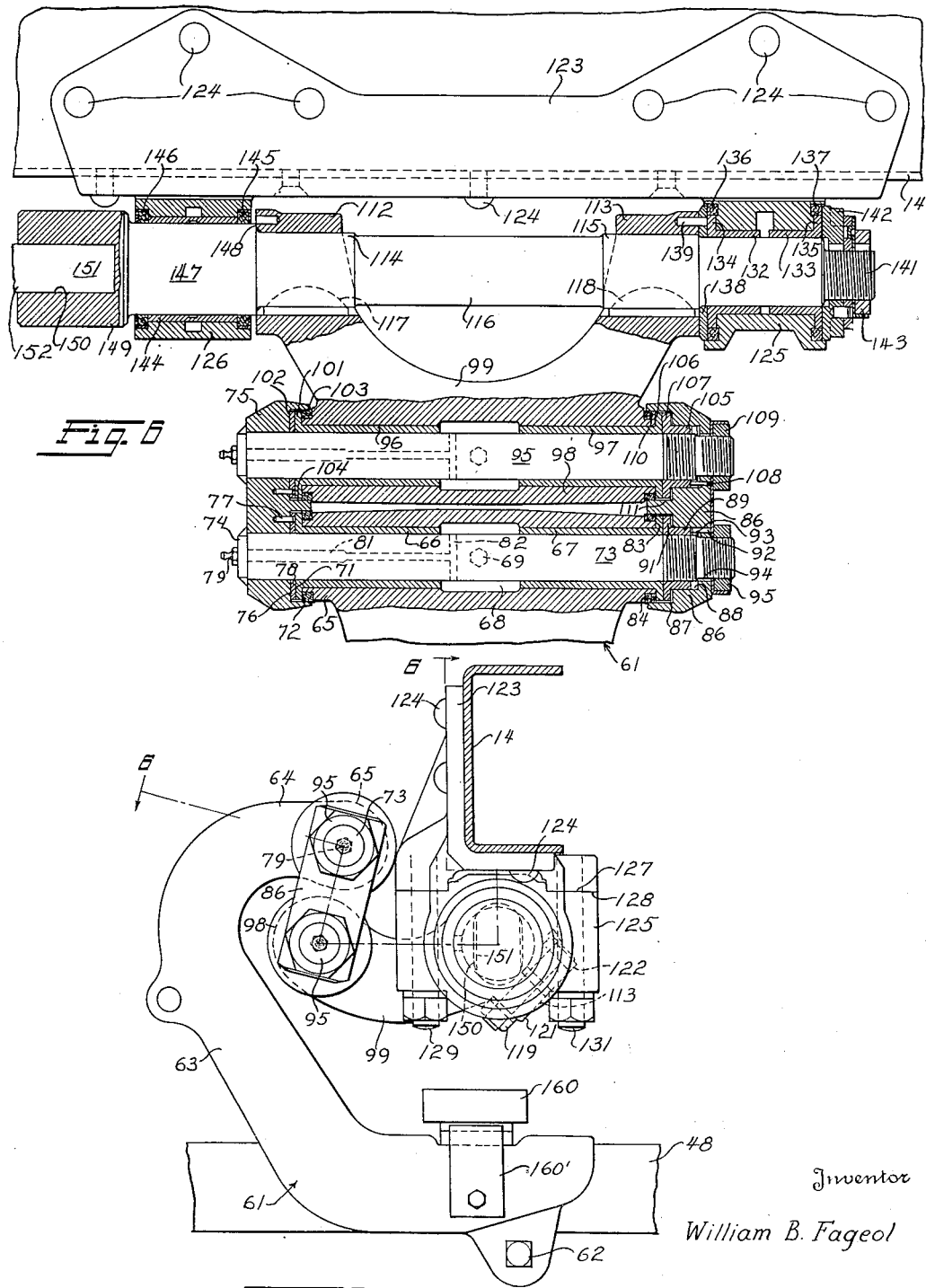

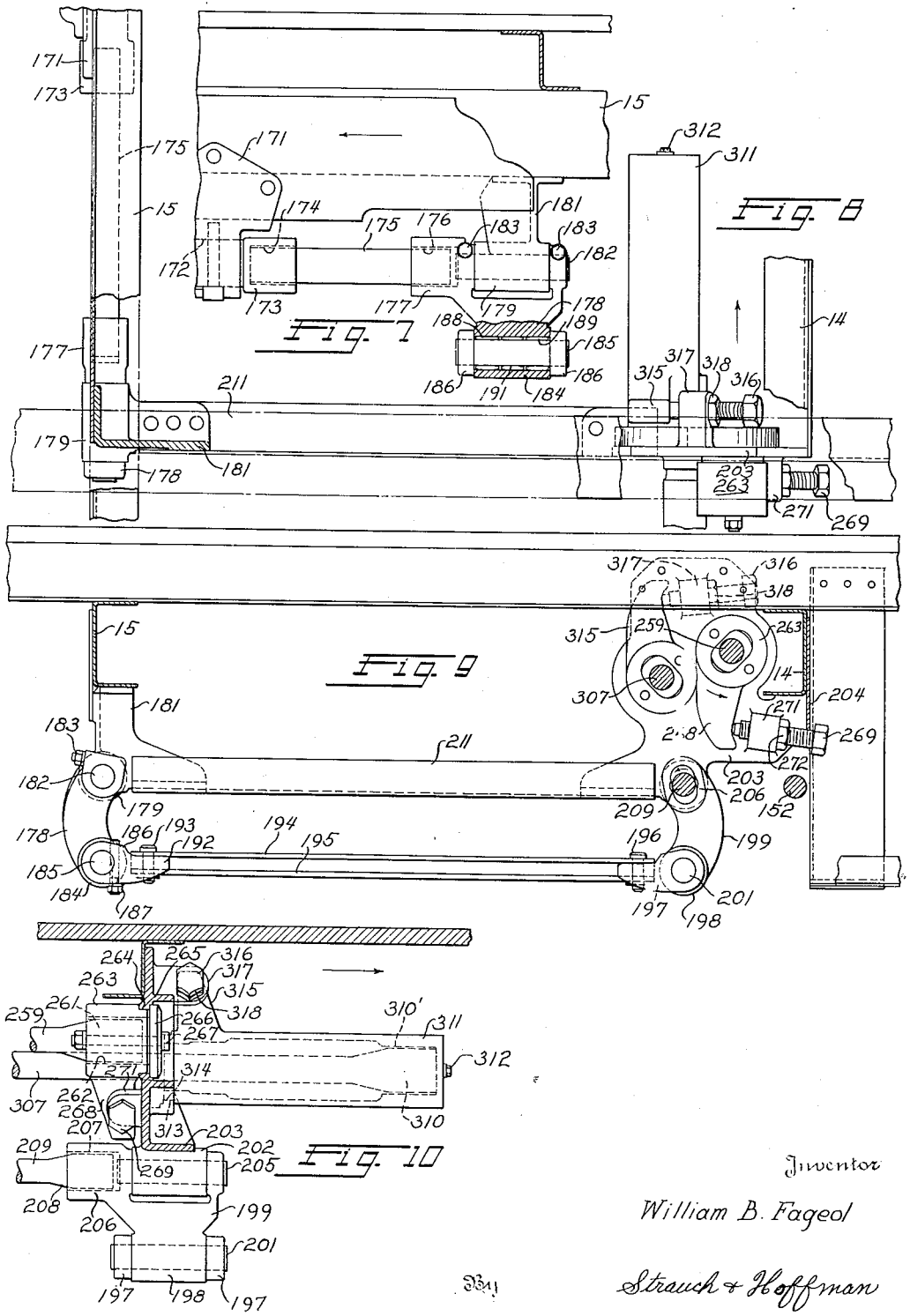

March 28, 1944.  W. B. FAGEOL  2,344,983
VEHICLE SPRING SUSPENSION
Filed Dec. 23, 1940  7 Sheets-Sheet 5
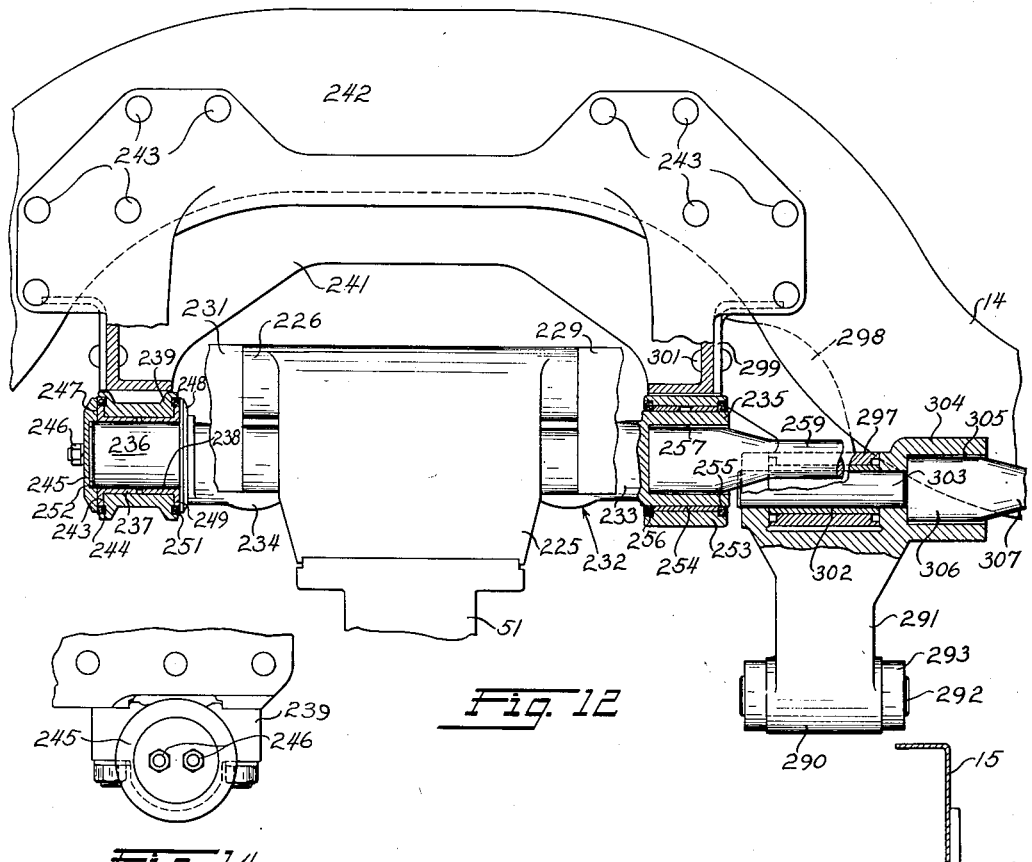
Fig. 12
Fig. 14
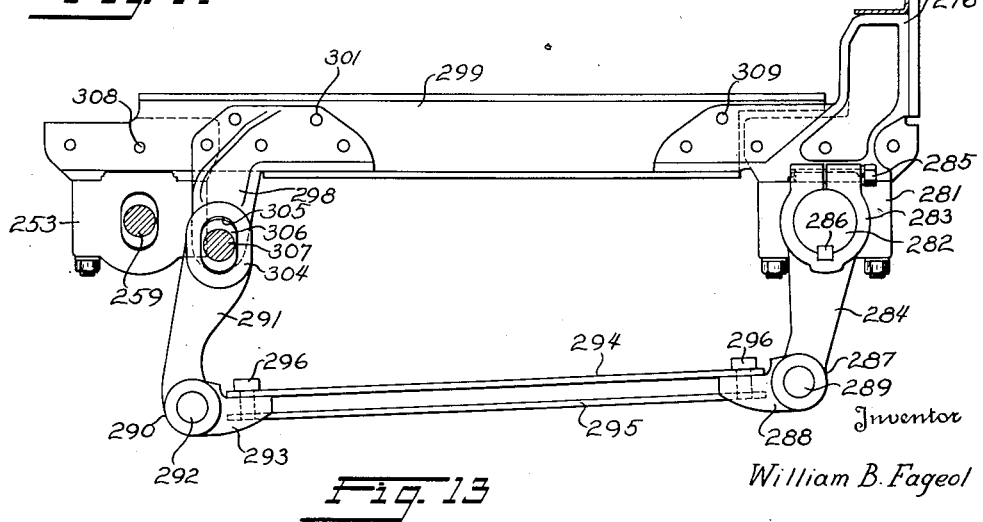
Fig. 13
Inventor
William B. Fageol
By Strauch & Hoffman
Attorneys

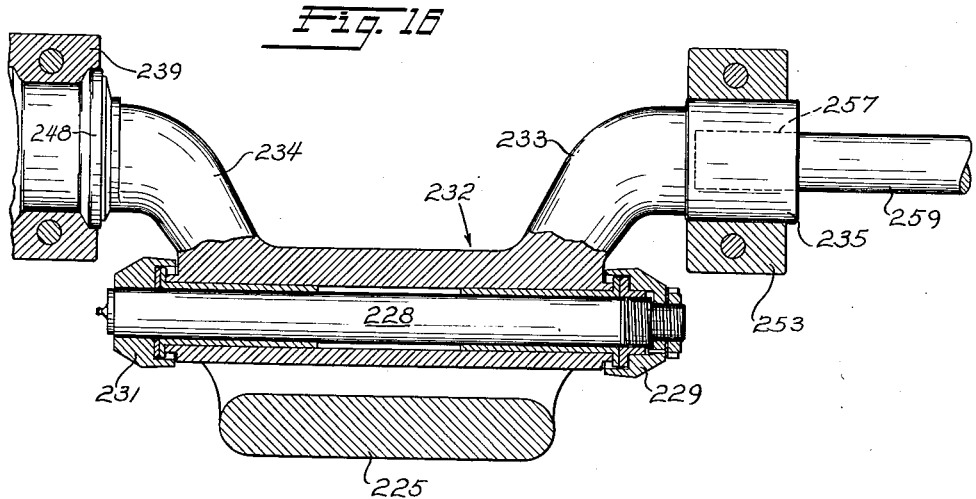
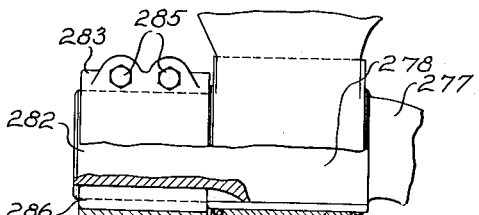
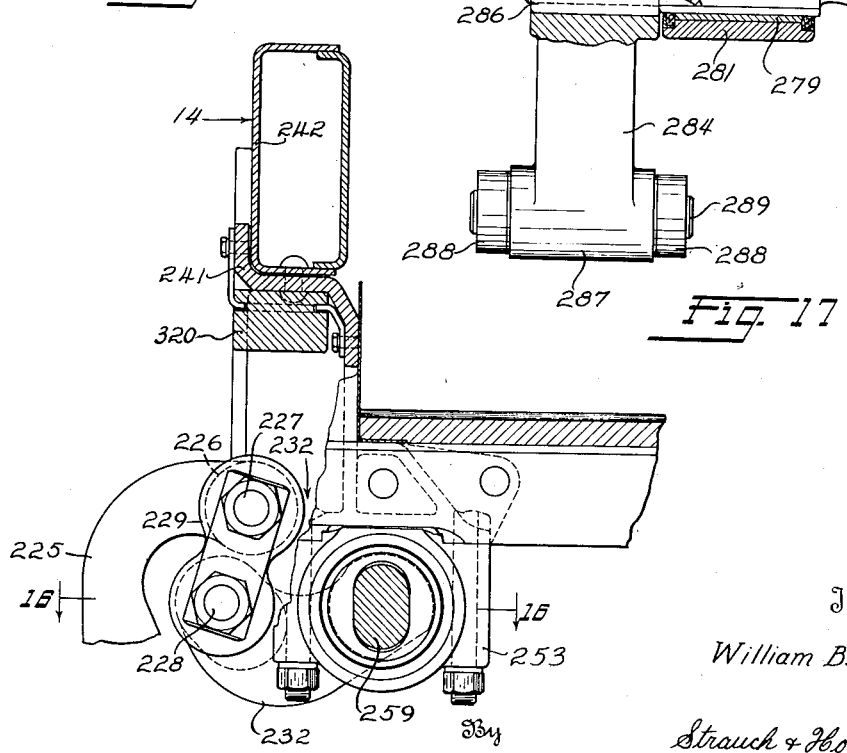

March 28, 1944.  W. B. FAGEOL  2,344,983
VEHICLE SPRING SUSPENSION
Filed Dec. 28, 1940  7 Sheets-Sheet 7
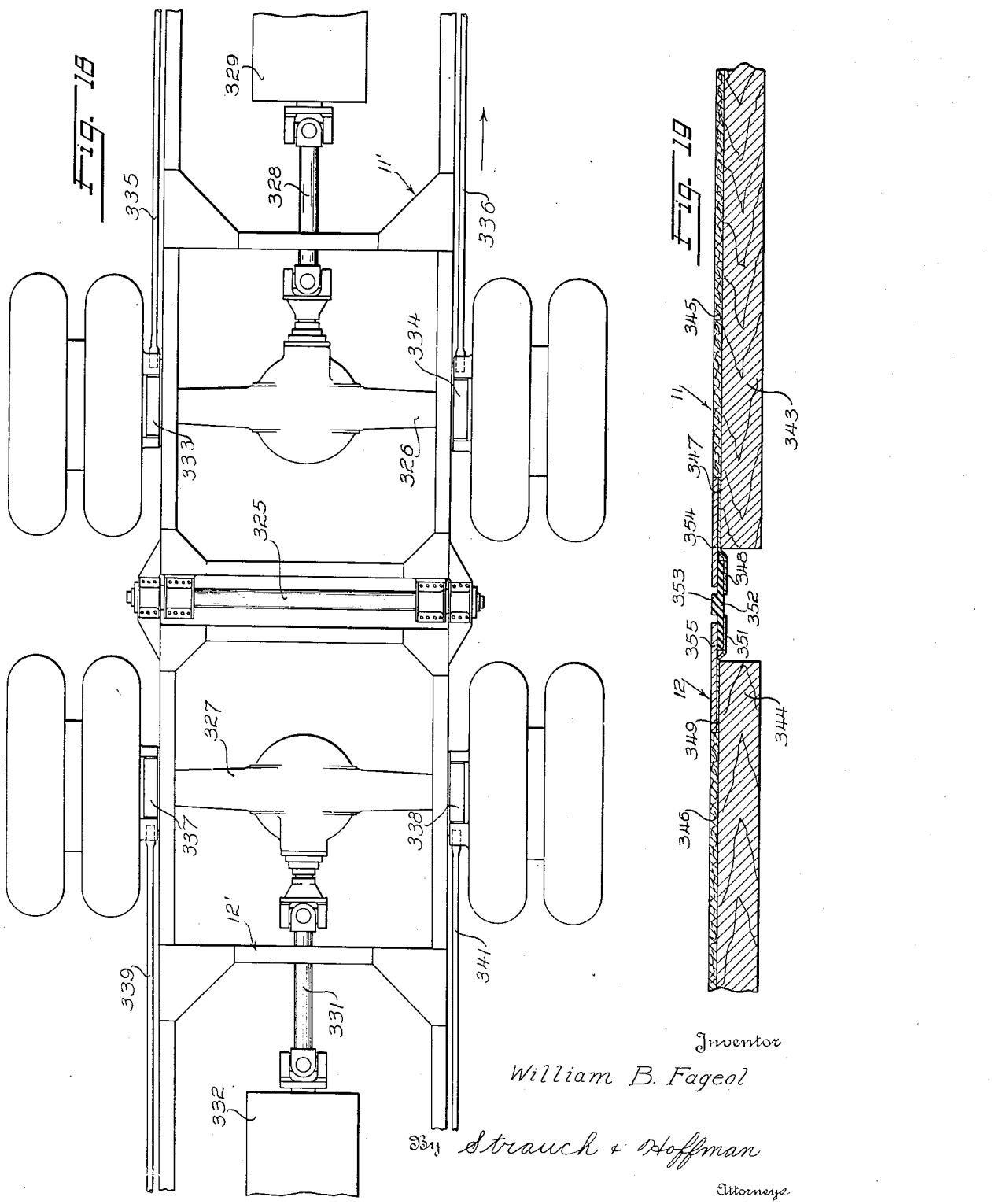
Inventor
William B. Fageol
By Strauch & Hoffman
Attorneys Patented Mar. 28, 1944

2,344,983

UNITED STATES PATENT OFFICE 2,344,983

VEHICLE SPRING SUSPENSION

William B. Fageol, Kent, Ohio, assignor to Twin Coach Company, Kent, Ohio, a corporation of Delaware Application December 28, 1940, Serial No. 372,151

26 Claims. (Cl. 180—1)

This invention relates to vehicle spring suspensions and is more particularly concerned with vehicle spring suspensions for controllably cushioning lateral stresses between the sprung and unsprung elements of the vehicle.

The invention will be described as it is presently embodied in an improved passenger carrying vehicle of the type disclosed and claimed in my copending application Serial No. 210,030, filed May 25, 1938, Patent No. 2,251,584, Aug. 5, 1941, of which this application is a continuation-in-part.

Briefly this vehicle comprises a pair of open-ended body sections, each section comprising integrally united body and base frame portions, interconnected to be flexible about a transverse joint, but the body is rigid against lateral flexure along its entire length. The front end of the front body section and the rear end of the rear body section are supported by axles having ground engaging dirigible wheels at opposite ends, and a single drive axle having ground engaging dual wheels at opposite ends supports the rear end of the front body section just forwardly of the transverse joint.

In the earlier embodiments of my vehicle illustrated in my above-entitled application, the axles were connected to the body sections by the usual leaf springs. Since this type of spring is usually designed to effectively resist side thrusts between the sprung and unsprung elements of the vehicle, these thrusts are mainly transmitted between the body and axles resulting in sidewise drag on the tires, especially the drive wheel tires, when the vehicle is rounding a curve or travelling over an uneven roadway. This drag causes considerable tire wear and also loss of power due to poor traction. Furthermore, in my earlier vehicle, it was necessary to carefully design the body frame and other vehicle elements of sufficient strength to withstand shocks and strains incident to such side thrusts.

In the present invention, I have redesigned my earlier spring suspension to eliminate this objectionable sidewise tire drag by providing a special suspension designed to laterally cushion side thrusts between the body and axles. I have found torsion rod springs especially suitable for this purpose and such will be described herein for purposes of illustration although it will be understood that any mechanism having equivalent function is embraced by the scope of the invention.

My invention also includes special torsion rod spring arrangements essential in certain improved gas—or Diesel—electric driven vehicles for enabling the gas or Diesel prime mover to be properly located for desired traction-improving weight distribution while retaining the benefits of the laterally cushioned spring suspension principle of the invention. These special torsion rod spring arrangements and supports may be employed in any two or more axle vehicles, as well as the jointed vehicle of the preferred embodiment.

With the above in mind it is a major object of the present invention to provide a novel, relatively light but sturdy jointed vehicle having special spring mechanism controllably laterally cushioning side thrusts between the sprung and unsprung parts of said vehicle A further object of the invention is to provide a vehicle, which is laterally rigid but flexible about a transverse joint, wherein the body and axles are connected by novel torsion rod spring assemblies designed to laterally cushion side thrusts therebetween.

A further object of the invention is to provide a novel vehicle wherein the heavy prime mover is located at one side of the vehicle for maximum accessibility and thereby provides unbalanced weight distribution on the frame, and the springs connecting the axles and body are designed to be uniformly responsive to their proportionate loads.

A further object of the invention is to provide a novel vehicle wherein the prime mover and other drive elements are arranged in unbalanced weight distribution on the vehicle and wherein suitable springs, such as torsion rod spring assemblies of special design to have equal deflection curves so as to be uniformly responsive to their proportionate unequal loads, are provided between the body and supporting wheels. Specifically I employ torsion rods of different cross-sectional diameter for different loads.

It is a further object of the invention to provide a vehicle or vehicle section supported by front and rear wheel assemblies wherein the prime mover is located at one side of the longitudinal center line adjacent one of the main longitudinal frame rails and all of the torsion rods necessary for springing the wheel assemblies are disposed along the main longitudinal frame rail at the other side of the longitudinal center line.

A further object of the invention is to provide a vehicle or vehicle section having front and rear supporting legs wherein four longitudinal torsion rod springs, one for each end of each axle, are disposed along the main longitudinal frame member at one side of the longitudinal center line, and special transverse relay mechanism is provided for connecting the axle ends at the other side of the longitudinal center line to the two torsion rods associated therewith.

Further objects of the invention will presently appear as the description proceeds in connection with the appended claims and the annexed drawings wherein:

Figure 1 is a diagrammatic plan view of a vehicle frame embodying the principles of the invention, illustrating the transverse hinge for the body base frame sections and my preferred arrangement of power unit, drive motor and torsion rod springs;

Figure 2 is an enlarged side elevation, partly in section, of the front part of the vehicle of Figure 1;

Figure 3 is an enlarged side elevation, partly in section, of the rear part of the vehicle of Figure 1. Figure 3 is a rearward continuation of Figure 2;

Figure 4 is an enlarged top plan view of the body base frame of the front body section illustrating the torsion rod springs;

Figure 5 is a front end view partly in section illustrating the spring linkage between the vehicle frame and the right hand end of the front axle;

Figure 6 is a section substantially along line 6—6 of Figure 5 illustrating details of the torsion lever linkage;

Figure 7 is a fragmentary side view, partly in section, illustrating connection of the torsion rod linkage at the left side of the front axle to the relay mechanism;

Figure 8 is a fragmentary top plan view, partly in section, of the front end of the base frame of the front body section illustrating the relay mechanism further and also the special bracket for anchoring the drive axle torsion rods;

Figure 9 is a section along line 9—9 of Figure 4 illustrating further the relay and bracket construction;

Figure 10 is a side elevation, partly in section, illustrating further the torsion rod relay and anchor bracket;

Figure 11 is an enlarged fragmentary view illustrating the manner of anchoring the torsion rods from the front axle;

Figure 12 is an enlarged side elevation, partly in section, illustrating the torsion rod linkage and relay mechanism at the right hand side of the drive axle;

Figure 13 is a section along line 13—13 of Figure 4 illustrating the relay mechanism at the drive axle;

Figure 14 is a rear end view of the support for the torsion lever yoke of Figure 12;

Figure 15 is a front end view, partly in section, of the torsion lever at the right side of the drive axle;

Figure 16 is a section along line 16—16 of Figure 14 illustrating the torsion rod linkage at the drive axle;

Figure 17 is a side elevation of the relay mechanism at the left side of the drive axle;

Figure 18 is a diagrammatic plan view of a jointed four axle vehicle equipped with a spring suspension according to the invention; and Figure 19 is a fragmentary section illustrating the flexible floor section above the transverse body hinge.

Referring to Figure 1, my vehicle comprises a pair of individual body and chassis sections 11 and 12 which are open to each other at adjacent ends and interconnected by a flexible wall section at 13.

Each body section comprises a unitary body base frame upon which the sides, ends and roof of the body are assembled, preferably in the manner described in my Patent No. 1,877,653, so that each body section comprises a combined unitary chassis and body frame of relatively light structural metal elements.

The body base frame of front body section 11 comprises a pair of relatively sturdy longitudinal rails 14 and 15 and a plurality of longitudinally spaced parallel transverse beams 16. The body base frame of rear section 12 comprises a pair of longitudinal rails 17 and 18, aligned with rails 14 and 15, and a plurality of longitudinally spaced parallel transverse beams 19.

A heavy bracket 21 (Figure 4) having an integral hollow boss 22 is rigidly secured, as by riveting or welding, upon the rear end of rail 14. Boss 22 fits between the arms of bifurcated portion 23 of a heavy bracket 24 rigid with the end of rail 17. The arms of bracket portion 23 are apertured to receive a short hinge pin 25 which has an intermediate cylindrical pivot section passing through hollow boss 22. The opposite ends of pin 25 are suitably non-rotatably anchored in bracket portion 23 and the inner end of pin 25 is threaded to receive a lock nut 26 securing it against axial displacement.

A plurality of thin annular rotatable metal shims or thrust washers 27 are provided on pin 25 between adjacent edges of boss 22 and the arms of bracket portion 23. A suitable grease fitting for lubricating the pivotal joint between the brackets is provided at 28.

Similar brackets 29 and 31 are rigid with adjacent ends of rails 15 and 18, respectively, and a hollow integral boss 32 on bracket 29 fits between the arms of a bifurcated portion 33 of bracket 31. A pivot pin 34, similar to pin 25 and non-rotatably secured between the arms of bracket portion 33, has an intermediate cylindrical pivot section passing through boss 32 and is secured to bracket 21 by lock nut 35. Shims or thrust washers 36, similar to those at 27, are provided on pin 34 between boss 32 and the arms of bracket portion 33. A lubrication fitting 37, similar to that at 28, is provided on the outer end of pin 34.

Pins 25 and 34 are axially aligned and extend normal to the longitudinal center line of the vehicle, and provide a transverse pivot or hinge between body sections 11 and 12. This pivot permits no lateral movement between the bracket pairs 21, 24 and 29, 31 and thereby insures against lateral bending of the entire vehicle throughout its length. Shims 27 and 36 take most of the axial thrust at the pivots and thereby reduce wear on the heavy brackets. The shims can be replaced inexpensively and quickly when worn.

Front body section 11 carries the power unit consisting mainly of an internal combustion engine 38, preferably a Diesel engine, and an electric generator 39 driven by the engine. The power unit is supported on the base frame by a three point suspension at the bracket indicated at 41, 42, 43 in Figure 4, but since the details of this suspension are not part of the present invention further description of the same is believed unnecessary.

This suspension is designed to position the power plant wholly at one side of the longitudinal center line of the vehicle so as to be quickly and readily accessible through a removable panel in the vehicle side wall for repairs and adjustment. As a result of this location of the power plant, I have found it necessary to shape left frame rail 15 to pass upwardly and over the top of the power plant. This upwardly bent portion of rail 15 is indicated at 44 in Figure 2. Frame rail 14 has no upper level portion similar to that at 44 on rail 15 and is of usual design.

The vehicle battery 45 is carried by body section 11 (Figure 1) outwardly of rail 14 and opposite the power plant. Rear body section 12 carries the fuel tank 46 and an electric motor 47. Battery 45, tank 46 and motor 47 represent the heaviest units carried by the vehicle other than the power plant and are so distributed along the base frames of the body sections as to effectively counterbalance to as great a degree as possible the effect of the laterally offset heavy power plant.

In the illustrated embodiment, the vehicle is supported upon front and rear axles 48 and 49, respectively, and an intermediate drive axle 51. Axles 48 and 49 are of usual steerable axle construction having dirigible wheels 52 and 53, respectively, at opposite ends. At the left forward corner of the vehicle, suitable steering controls are indicated at 54. These controls are connected by suitable linkages 55 and 56 to simultaneously steer wheels 52 and 53. The details of this steering mechanism may be the same as disclosed in application Serial No. 210,030, referred to above, and need not be further described here since they form no part of the present invention.

Drive axle 51 is of a conventional design, having a laterally offset differential bowl 57 aligned with motor 47. A suitable universally jointed propeller shaft 58 interconnects motor 47 and the drive axle shafts within axle 51 for driving dual drive wheels 59 at opposite ends of the axle.

I have found that the most satisfactory location for axle 51 is beneath the rear part of front body section 11 just forwardly of the joint between the body sections. The weight of the power plant, battery, electric motor, fuel tank and other heavy vehicle parts is effectively concentrated adjacent axle 51 to provide maximum traction at wheels 59 under all operating conditions.

Axles 48, 49 and 51 are preferably connected to the body sections by torsion rod spring assemblies, one spring assembly for each end of each axle, as will be described below.

*Front axle—Right side*

Referring to Figures 1, 2, 4, 5 and 6, a sturdy, rigid bracket 61 is fixedly secured as by bolts 62 upon axle 48 inwardly of the dirigible wheel mounting. Bracket 61 is formed with an outwardly and upwardly inclined portion 63 which terminates in a short inwardly projecting integral arm 64.

The inner end of arm 64 (Figure 6) comprises an elongated hollow boss 65 which is lined at opposite ends with bushings 66 and 67. The inner ends of bushings 66 and 67 are spaced and the interior of boss 65 is cut away to provide a large lubricant reservoir 68 having an outlet closed by plug 69.

Bushing 66 is formed at its outer end with an integral thrust bearing flange 71 seated against the adjacent edge of boss 65 and an annular grease seal 72 mounted in a shoulder on boss 65. An accurately machined hardened steel shackle pin 73 extends through boss 65 and is rotatably supported by bushings 66, 67. At its rear end, pin 73 projects beyond boss 65 and is formed with an enlarged integral head 74 bearing against the outer face of a metal strap 75 suitably non-rotatably secured upon the end of pin 73.

The inner face of strap 75 is formed with a cylindrical recess 76 at the bottom of which is secured, as by pin 77, an annular flat machined thrust bearing plate 78 of hardened steel in full surface contact with flange 71. Recess 76 is of such depth as to surround flange 71 and snugly fit over the periphery of seal 72 so as to provide a grease tight joint between strap 75 and boss 65.

Pin 73 is provided with a grease fitting 79 which communicates with an axial bore 81 and a radial bore 82 to introduce lubricant into chamber 68.

Bushing 67 is formed at its outer end with an integral thrust flange 83 seated against the adjacent edge of boss 65 and a grease seal 84 mounted in an end shoulder on boss 65. Pin 73 extends forwardly through an apertured strap 86 similar to strap 75.

Strap 86 is formed with an internal cylindrical recess 87 at the bottom of which is a smaller recess 88. A hardened steel collar 89 is threadedly mounted on pin 73 and provided with a flat inner flange 91 flush with bushing flange 83. Collar 89 is non-rotatably seated in recess 88 so as to be rigid with strap 86, and recess 87 is of such depth as to extend over flanges 83 and 91 and seal 84 to provide a grease tight seal between strap 86 and boss 65.

A pin 92, rigid with strap 86, fits into a slot 93 across the outer end of sleeve 89 to lock sleeve 89 against accidental rotation relative to the strap. The outer threaded end of pin 73 extends through an aperture 94 at the bottom of recess 88 and carries a lock nut 95.

Straps 75 and 86 are parallel and extend downwardly and outwardly from pin 73 (Figure 5). The lower ends of straps 75 and 86 are non-rotatably connected to opposite ends of a second shackle pin 95 which is rotatable in bushings 96 and 97 lining an elongated hollow boss 98 comprising the outer end of a yoke 99.

The lower end of strap 75, as clearly illustrated in Figure 6, is connected to pin 95 in exactly the same manner that its upper end is connected to pin 73 with bushing flange 101, thrust plate 102 and seal 103 corresponding to flange 71, plate 78 and seal 72. Internal recess 104 at the lower end of strap 75 extends over seal 103 and forms a grease tight joint between the strap and boss 98.

Similarly collar 105, flanges 106 and 107, pin 108, nut 109 and seal 110 correspond to collar 89, flanges 83 and 91, pin 92, nut 95 and seal 84. Internal recess 111 at the lower end of strap 86 extends over seal 110 and forms a grease tight joint between boss 98 and the strap.

Straps 75 and 86 and pins 73 and 95 are thereby rigidly interconnected and comprise a sturdy rectangular link pivotally interconnecting bracket 61 and yoke 99. The axes of pins 73 and 95 are parallel to each other and the vehicle longitudinal center line.

At its inner end yoke 99 comprises a pair of integral arms terminating below rail 14 in hollow split bosses 112 and 113 surrounding spaced enlarged portions 114 and 115 of a rod 116. Suitable key and keyway assemblies indicated at 117 and 118 secure yoke 99 non-rotatably to rod 116.

As illustrated in Figure 5, each split boss 112 and 113 is provided with a suitable bolt and lock nut assembly 119 for drawing together lips 121 and 122 and thereby clamping the bosses about rod portions 114 and 115 after the keys have been positioned.

A heavy rigid bracket 123, generally L-shaped in cross section, is attached to frame rail 14, as by rivets 124, directly above axle 48. Below rail 14, bracket 123 is formed for the attachment of longitudinally spaced bearing support members 125 and 126. As illustrated in Figure 5, front bearing support member 125 is formed with flat horizontal upper faces 127 which fit flush with flat lower faces 128 on bracket 123. Suitable stud and lock nut assemblies 129 and 131 are employed to secure member 125 firmly and non-rotatably to bracket 123.

Bearing support member 126 is preferably secured to bracket 123 in a manner identical with that above described for member 125.

Front bearing support member 125 is lined with spaced bushings 132 and 133 having integral flanged outer ends 134 and 135 seated in recesses at opposite ends of member 125. Flanges 134 and 135 are surrounded by grease seal annuli 136 and 137, respectively. A hardened steel annular, flat thrust plate 138 is non-rotatably secured to boss 113, as by pin 139, and is flush with flange 134 and seal 136.

The front end of rod 116 is rotatably supported in bushings 132, 133 and terminates beyond member 125 in a reduced portion 141 on which is threaded a hardened steel thrust collar 142 having a flat inner face flush with bushing flange 135 and seal 137. A suitable lock washer and nut assembly indicated at 143 on threaded rod portion 141 secures collar 142 non-rotatably to rod 116 and prevents accidental relative axial displacement between them.

Rear bearing support member 126 is lined with a bushing 144 and recessed at opposite ends to seat grease seals 145 and 146. Bushing 144 rotatably supports an enlarged cylindrical portion 147 of rod 116, and an inner annular thrust shoulder 148 on rod portion 147 fits flush with the rear end face of boss 112.

Beyond member 126, rod 116 is formed with an enlarged head 149 having a rearwardly facing internal generally oval socket 150 in which is non-rotatably seated the correspondingly shaped upset end 151 of an elongated cylindrical torsion rod spring 152. Rod 152 is axially aligned with rod 116 which is parallel to pins 73 and 95. Rod 152 extends rearwardly below and parallel to frame rail 14 and its rear end is upset to oval shape at 153 (Figure 11) to fit non-rotatably within a socket 154 formed in a block 155 rotatably carried by a sturdy bracket 156.

Bracket 156 is rigid with a sub-frame assembly 157 secured as by welding to a depending ribbed support 158 which is attached to rail 14 as by rivets 159. Block 155 is so mounted on sub-frame 157 as to be rotatable about the longitudinal axis of rod 152. An enlarged cap 161 is secured, as by cap screws 162, upon the free end of block 155 beyond bracket 156. Cap 161 and block 155 are maintained against axial displacement on bracket 156.

Block 155 is formed with an integral radial arm 163 having a threaded aperture for receiving an adjustable bolt 164. Adjustment of bolt 164 is locked by nut 165, and the tip end of bolt 164 abuts against an integral stop formation 166 on bracket 156 to resist rotation of block 155 in one direction.

Referring to Figures 5 and 11, the body load supported by the linkage above described urges clockwise rotation of yoke 99 and rod 116 about the axis of rod 116 and consequently rod 152 is urged to rotate clockwise. Rod 152 is, however, anchored against such rotation at its rear end as bolt 164 is in contact with stop 166 so that rod 152 is normally under torsion due to the body load when the vehicle is resting on a flat roadway and during normal operation. The degree of torsion in rod 152 may be varied by adjustment of bolt 164.

A shock absorbing block 160 of rubber or like material is carried by a special support 160' secured upon bracket 61 above axle 48 and directly below the above described suspension linkage.

*Front axle—Left side*

Referring to Figures 1, 4 and 7, the left side of axle 48 is connected to rail 15 by a suspension comprising axle bracket 167, downwardly and outwardly inclined link 168, yoke 169 and frame bracket 171. These suspension elements are preferably substantially identical with the corresponding suspension elements at the other end of axle 48 except for being reversed for proper attachment, and further detailed description is therefore believed unnecessary.

Rod 172 (Figure 7), which corresponds to rod 116 at the other end of axle 48, is formed at its rear end with an enlarged head 173 having a rearwardly facing socket 174 in which is non-rotatably secured the front end of a short longitudinal bar 175. The rear end of bar 175 is non-rotatably secured within a socket 176 formed in a boss 177 integral with a swingable relay arm 178.

The upper end of arm 178 is bifurcated and embraces a hollow bearing support boss 179 rigid with a depending bracket 181 secured to rail 15. A bearing pin 182, coaxial with bar 175, is rotatably supported within boss 179 and its opposite ends are keyed and otherwise non-rotatably secured to arm 178 by suitable fastening elements 183.

The lower end of arm 178 comprises a hollow boss 184 rotatably carrying a pin 185, the opposite ends of which are keyed and non-rotatably secured to a bifurcated connecting member 186 by suitable fastening elements 187 (Figure 9). Pin 185 is supported within boss 184 by lubricated roller bearing assemblies 188 and 189 of the so-called "needle" bearing type. Bearing assemblies 188 and 189 are separated by a spacer collar 191. Similar needle bearing arrangements are preferably employed surrounding pin 182 within boss 179.

Member 186 is formed with an inner lip 192 secured as by pin and washer assembly 193 to one end of a compound transverse relay comprising upper and lower rigid parallel straps 194 and 195. At the other side of the frame straps 194 and 195 are similarly secured, as by pin and washer assembly 196, to a bifurcated connecting member 197 similar to member 178. The arms of member 197 embrace a hollow boss 198 (Figure 10) at the bottom of a second swingable relay arm 199 and are suitably non-rotatably secured upon opposite ends of a pin 201 rotatably supported in boss 198 by needle bearings similar to those in boss 184.

At its upper end, arm 199 is bifurcated to embrace a hollow boss 202 integral with a rigid bracket 203 attached by flange 204 to frame rail 14. A pin 205, rotatably carried in boss 202 by needle bearings similar to those in boss 184, has its opposite ends non-rotatably secured to arm 199 by fastening elements (not shown) similar to those at 183.

The rear end of arm 199 is formed with a boss 206 having a rearwardly facing generally oval-shaped socket 207 for non-rotatably seating the upset correspondingly shaped front end 208 of a torsion rod spring 209. Brackets 181 and 203 are rigidly interconnected by a transverse reinforcing beam 211 extending therebetween below the level of rails 14 and 15 and parallel to straps 194, 195.

Rod 209 extends rearwardly parallel to rod 152 and adjacent rail 14 and has its upset rear end 212 (Figure 11) seated non-rotatably in a generally oval shaped socket 213 formed in an anchor block 214 rotatably carried by a bracket 215 rigid with sub frame 216 suitably secured to the base frame of front body section 11. The axis of rotation of block 214 is aligned with the axis of rod 209. A suitable closure cap 217 is secured to block 214 as by cap screws 218.

Block 214 is formed with an integral radial arm 219 having a threaded aperture for receiving an adjustable bolt 221 which can be locked in adjusted position by nut 222. The tip of bolt 221 abuts against stop shoulder 223 of bracket 215 to anchor rotation of rod 209 in one direction.

The body load is effective through the suspension linkage at 167, 168, 169 and 171, bar 175, relay arm 178, straps 194, 195 and relay arm 199 to urge rotation of rod 209 counterclockwise as seen in Figure 9. The rear end of rod 209 is, however, anchored against such rotation while bolt 221 abuts stop 223 so that rod 209 is normally under torsion due to the body load. The degree of torsion of rod 209 may be adjusted by manipulation of bolt 221.

Pins 182, 185, 201 and 205 are parallel to each other and the longitudinal center line of the vehicle, while straps 194, 195 extend substantially normal to that center line. The above described relay mechanism has no lost motion connections and transfers motion of the suspension linkage at the left side of axle 48 to rod 209 with the same efficiency as if rod 209 were connected directly to rod 172 and disposed along the frame at that side.

A bumper block (not shown) similar to block 160 is employed beneath the above suspension linkage.

*Drive axle—Right side*

Figure 12 illustrates the suspension for drive axle 51 as viewed from the right side of the vehicle. Bracket 225, similar to bracket 61, has its lower end rigidly secured to the housing of axle 51 in a suitable manner. Its upper end extends upwardly and outwardly and then inwardly to terminate in an elongated boss 226.

A rotatable shackle pin 227 is mounted in boss 226 in a bearing assembly similar to that employed for mounting pin 73 in boss 65. A second rotatable shackle pin 228 is rigidly secured to pin 227 by straps 229 and 231 which are preferably substantially identical with straps 75 and 86 of Figure 6. Pin 228 is rotatably supported in the outer end of a yoke 232 in a bearing assembly similar to that employed for mounting pin 95 on yoke 99.

The link comprising pins 227 and 228 and straps 229 and 231 extends downwardly and outwardly from the suspending pivot axis of pin 227 at an angle equal to that of the corresponding link at the front axle.

Yoke 232 extends inwardly and comprises a pair of diverging arms 233 and 234 (Figure 16) terminating in axially aligned, oppositely extending cylindrical bearing bosses 235 and 236 (Figure 12).

Rear boss 236 is rotatably carried by spaced bushings 237 and 238 lining a hollow bearing support member 239 rigid with a heavy bracket 241 rigidly bolted to the arcuate portion 242 of frame rail 14 as by rivets 243. The rear end of bushing 237 is formed with a thrust flange 243 surrounded by a sealing annulus 244 both seated in an end recess in member 239. A hardened steel thrust plate 245, secured to boss 236 as by the stud and lock nut assemblies 246, has a flat annular bearing face 247 flush with flange 243 and seal 244.

At the forward end of boss 236, arm 234 is formed with an enlarged integral flange 248 which overlies thrust flange 249 on bushing 238 and the surrounding grease seal 251. When the fastening assemblies at 246 are drawn tight, flange 248 and plate 245 are pulled against the bushing flanges but shims 252 are provided to insure sufficient axial clearance to prevent this operation from binding the yoke against rotation.

Front boss 235 is rotatably mounted in a hollow bearing support member 253 rigid with bracket 241. A bushing 254 surrounds boss 235 and oil seals 255 and 256 are seated in shouldered recesses at opposite ends of member 253. Both bearing support members 239 and 253 are preferably removably secured to bracket 241 in the same manner that member 125 is secured to bracket 123 in Figure 5.

Boss 235 is formed with a generally oval forwardly facing socket 257 in which is non-rotatably mounted the correspondingly shaped enlarged rear end 258 of a torsion rod 259.

Rod 259 extends forwardly adjacent rail 14 parallel to rods 209 and 152 and terminates in an enlarged upset terminal portion 261 (Figure 10) non-rotatably seated in a correspondingly shaped socket 262 in an anchor block 263.

At its forward end, block 263 is formed with an annular recessed shoulder 264 by which it is rotatably seated in an apertured boss 265 on bracket 203. A cap 266, non-rotatably secured to block 263 as by the bolt assemblies 267, is similarly rotatably seated in a recessed shoulder of boss 265 at the opposite side of the bracket. Bolts 267 are tightened sufficiently to prevent axial displacement of block 263 but permit relatively free rotation of the block.

Block 263 is formed with an integral radial projection or stop 268 adapted to engage the tip end of an adjustable bolt 269 threadedly mounted in a lug 271 integral with bracket 203. A lock nut 272 retains bolt 269 in adjusted position.

The body load is effective through the suspension linkage at the right side of axle 51 to urge rotation of rod 259 counterclockwise in Figure 9, and thereby maintains rod 259 under torsion. The degree of torsional stress in rod 259 may be regulated by adjustment of bolt 269.

*Drive axle—Left side*

At the opposite side of axle 51 a bracket 273, strap link 274 and bifurcated yoke 275 comprise a suspension lever assembly, identical with that formed by bracket 225, yoke 232 and the interconnecting strap link, connecting the axle housing with a sturdy frame bracket 276 similar to bracket 241.

The rear arm of yoke 275 is rotatably supported in a bearing support member identical with member 239 at the other side of the axle, and details of this connection therefore need not be further described.

Front arm 277 of the yoke (Figure 17) terminates in a cylindrical boss 278 rotatably supported in a bushing 279 on open-ended bearing support member 281 identical with member 253 at the other side of the axle. A reduced end portion 282 of boss 278 projects forwardly from member 281 into a split hollow boss 283 formed at the upper end of a swingable relay arm 284. Bolt assemblies 285, which draw the split boss closed, and a suitable key and keyway assembly 286 secure boss 278 rigidly to relay arm 284.

The lower end of relay arm 284 comprises a hollow boss 287 seated between the arms of a bifurcated connecting member 288 to which it is rotatably connected by a pin 289. At the other side of the vehicle a hollow boss 290 at the bottom of a second relay arm 291 is rotatably connected by a pin 292 to a bifurcated connecting member 293 similar to member 288. A pair of parallel transverse straps 294 and 295 are secured at opposite ends to members 288 and 293 as by suitable fastening elements 296.

Details of this relay mechanism at the drive axle are substantially the same as those above described and illustrated in Figures 7–10. Preferably bosses 287 and 290 are lined with needle bearing assemblies to provide substantially frictionless transfer of the rocking motion of yoke 273.

At its upper end, relay arm 291 is bifurcated to fit with a hollow bearing support member 297 formed at the lower end of a bracket 298 secured to a transverse frame channel 299 as by rivets 301.

A bushing 302 lines member 297 and rotatably supports a cylindrical pin 303 which has its opposite ends non-rotatably secured in the bifurcated end of relay arm 291. Forwardly of pin 303, arm 291 is formed with a head 304 containing a generally oval socket 305 for seating the correspondingly shaped rear end 306 of a torsion rod 307.

Channel 299 is secured to bracket 241 at one end, as by rivets 308, and to bracket 278 at the other end, as by rivets 309, and thereby provides a strong transverse brace reinforcing the vehicle frame against stresses set up in the relay mechanism and reinforcing the relay mechanism support brackets by tying them rigidly together.

The front end 310 of rod 307 (Figure 10) is enlarged and upset to general oval shape and non-rotatably seated in a correspondingly shaped socket 310' formed in the base of an elongated tubular block 311 rotatably supported by bracket 203 which is apertured to permit passage of the rod therethrough. Cap screws or similar fastening elements 312 secure rod 307 to block 311. The rear end of block 311 is shouldered at 313 to fit rotatably with a flange 314 surrounding the bracket aperture through which rod 307 passes. Suitable means are provided for preventing displacement of block 311 axially of rod 307.

Block 311 is formed near bracket 203 with an integral radial stop projection 315 adapted to engage the tip end of a stop bolt 316 threaded in a lug 317 integral with bracket 203. A lock nut 318 secures bolt 316 in adjusted position.

Boss 278, pins 289, 292 and 303, and rod 307 are parallel to each other and to the longitudinal center line of the vehicle. The above described relay mechanism has no lost motion connections and motion from the suspension linkage at the left side of axle 51 is faithfully transmitted to rod 307 which is maintained under torsion by the body load, with stop 315 contacting bolt 316.

Suitable rubber bumper blocks 320 (Figure 15) are attached to the under sides of brackets 241 and 276.

Rear axle

The opposite ends of rear axle 49 are provided with suspension lever assemblies indicated at 321 and 322 in Figure 1. Suspension 321 is preferably substantially the same as that at the right side of axle 48 and is non-rotatably connected directly to the rear end of a torsion rod 323. Rod 323 extends below and parallel to rail 18 and has its front end anchored in a rotatable anchor block and adjustable stop assembly (not shown) similar to those illustrated in Figure 10 or Figure 11.

Suspension 322 is preferably substantially the same as that employed at the left side of axle 48 except that it is non-rotatably secured directly to the rear end of a torsion rod 324. Rod 324 extends below and parallel to rail 17 and has its front end anchored in a suitable rotatable anchor block and adjustable stop assembly similar to that of rod 323.

Since details of the torsion rod suspension for axle 48 are preferably similar to those for rods 152 and 259, further description is believed unnecessary for complete understanding of the invention.

Torsion rods

Rods 152, 209, 259, 307, 323 and 324 are made of high grade steel of such characteristics that the torsional stresses to which the rods are subjected during operation of the vehicle are well below the elastic limit. Preferably each rod is cylindrical in cross section except at its upset ends.

As explained above, the various loads supported by the vehicle frame are not uniformly distributed on the frame. The offset heavy power plant and similar units result in unbalanced loading at the axles. For example, the load at the left side of axle 51 greatly exceeds that at the right side of that axle. If springs 209 and 307 at opposite ends of axle 51 were identical, as is usual in vehicle manufacture, these unbalanced loads would result in dissimilar riding characteristics at opposite sides of the vehicle.

In order to secure similar riding characteristics on both sides of the vehicle, I employ torsion rods of different diameters and cross section so proportioned as to give equal deflection curves for the load carried thereby. In the illustrated embodiment, rod 307 is of larger diameter than rod 209 but the two rods have substantially equal deflection curves for the unequal loads which they bear, and hence the effective springing is the same as if the vehicle load was uniformly distributed and the rods were identical.

Similar practice is followed at the front and rear axles of the vehicles so that preferably all six torsion rods give equal deflection curves for the unequal loads carried thereby.

This phase of the invention is, of course, applicable to two or four or more axle vehicles as well as that above described.

Advantages

According to the invention, each end of each axle of the vehicle is connected to the body frame by a downwardly and outwardly inclined pivoted suspension link, thereby permitting independent relative lateral movement between each axle and the frame and at the same time controllably limiting and cushioning that movement by the springs. While torsion rod springs are preferred, the invention is not so limited.

The invention is especially desirable in a six-wheeled vehicle of the type illustrated. When such an elongated vehicle is rounding corners or curves the torsion spring suspension of the invention, in response to the lateral forces set up thereby, allows limited controlled cushioned relative lateral movement between the axles and the rigid body. This sidewise flexibility at each axle compensates for small errors in the spring assembly and results chiefly in reduced sidewise tire drag and reduced strain on the body members to which the spring suspension is attached.

This advantage is most noticeable at the drive axle and at the transverse joint between the body sections. In my earlier vehicle employing leaf springs, I experienced considerable difficulty because of undue tire wear and loss of traction at the drive wheels and breaking of the castings at the hinge between the body sections because of undue stresses transmitted through the leaf springs to the frame when the vehicle was turning. These difficulties are overcome by the lateral cushioning arrangements of the invention wherein the axles effectively float to find their own centers and are not dragged sidewise during turning. My improved vehicle shows increased tire life, and I have been able to reduce the size of some of the structural body members adjacent the center joint because of the reduced frame stresses.

My novel spring suspension also compensates for small errors in steering. In such an elongated vehicle, it is difficult to obtain and maintain steering connections in theoretically perfect alignment. In a vehicle wherein the springs have no lateral cushioning small imperfections in the steering are magnified and cause sidewise tire drag and body strain. The flexibility afforded by my lateral cushioning arrangement compensates for wear and insures perfect steering under all condition.

Besides affording easier steering and compensating for inaccuracies in the steering linkage, use of the laterally cushioned suspension of the invention has effectively increased the maximum turning angle and the vehicle can be easily turned around in the space required to turn a vehicle of the same wheel base as the front body section.

Eight wheel bus

Referring to Figure 18, body sections 11' and 12' are interconnected by a transverse hinge 325 which is preferably similar to the body section hinge illustrated in Serial No. 210,030 or may be the same as that illustrated in Figure 4.

Spaced parallel drive axles 326 and 327 support adjacent ends of the body sections forwardly and rearwardly of hinge 325. Axle 326 is connected by a drive shaft 328 to an electric motor 329 carried by front body section 11', and axle 327 is connected by a drive shaft 331 to an electric motor 332 carried by rear body section 12'. Motors 329 and 332 preferably derive their energy from a power plant similar to 38, 39.

Axle 326 is provided at opposite ends with suspension linkages 333 and 334 similar to those employed at opposite ends of axle 51. These linkages are connected to the rear ends of torsion rods 335 and 336. Where the power plant is located under a kicked-up portion of the left frame rail, as in Figure 2, the entire torsion rod suspension beneath front body section 11' is the same as the torsion rod and relay mechanism illustrated beneath body section 11 in Figure 1. Where the power plant is located otherwise, as across the rear end of the rear body section, torsion rods 335 and 336 simply extend along the adjacent frame rails and are anchored at their forward ends in a manner above described.

Axle 327 is provided at opposite ends with similar suspension linkages 337 and 338 connected to individual torsion rods 339 and 341 which are suitably anchored on the adjacent frame rails at the rear end of body section 12.

The front and rear steerable axles of the vehicle of Figure 18, which is otherwise the same as that of Figure 1, are connected to the body sections by torsion rod spring suspension systems similar to those at axles 48 and 49 of Figure 1.

The above described grouping of axles 326 and 327 has been found to be more desirable than the four wheeled truck disclosed in Serial No. 210,030. Since each axle is independently sprung, there is no such jumping or bouncing of the drive axles as is present where a multi-wheel truck is employed, and traction is consequently improved.

The axles are enabled to find their own centers due to the lateral cushioning of the gravity springs employed, and tire wear and body strain are eliminated as above explained.

Assembly of such a vehicle as illustrated in Figure 18 is relatively easy since each body section can be made substantially complete before hinging them together. This separation of the body sections is also important in servicing the bus.

Floor joint

Figure 19 illustrates a special flexible floor joint employed between body sections 11 and 12. Floors 343 and 344, rigid with body sections 11 and 12, respectively, lie in substantially the same plane when the vehicle is standing on a level surface.

Floor 343 is provided with the usual floor covering 345 which terminates short of the rear edge of the floor. Floor 344 is provided with a similar floor covering 346. A transverse sheet metal plate 347, secured to floor 343 by screws or the like, extends from the edge of covering 345 and past the rear edge of floor 343 where it is bent downwardly and rearwardly to form a ledge 348. A similar sheet metal plate 349 rigid with floor 344 is formed with a forwardly extending ledge 351 even with ledge 348 but spaced therefrom.

Ledges 348 and 351 support opposite arms of a transverse flexible strip 352, of rubber or like material. Strip 352 is of inverted T-shape in cross section with a vertical leg 353 upstanding to a level even with floor coverings 344 and 345.

Rigid metal plates 354 and 355 rigidly secured to plates 347 and 349, respectively, are flush with floor coverings 345 and 346 and extend toward each other to terminate a short distance, preferably about one eighth inch, from leg 353 for a purpose to be described.

Preferably strip 352 is vulcanized to plates 347 and 348 before assembly into the joint, so that the joint is weatherproof, and plates 354 and 355 positioned to complete edge sockets for the strip.

The above described floor joint permits relative inclination of the floors as the body sections rock about the transverse hinge and the spacing of the metal plates on the separate body sections insures that they will not be bent during such inclination. Moreover, the illustrated spacing between plates 354 and 355 and leg 353 and between plates 347 and 348 and the edges of strip 352 permit flow of the rubber as it is distorted during relative inclination of the floors. The joint is effectively a flexible continuation of floors 343 and 344 under all operating conditions of the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a laterally rigid frame, a front axle supported at opposite ends by dirigible wheels, a rear axle supported at opposite ends by dirigible wheels, a drive axle supported at opposite ends by wheels beneath opposite sides of said vehicle and located intermediate said front and rear axles, and laterally yieldable spring assemblies resiliently interconnecting said axles and frame, said spring assemblies permitting independent controlled relative lateral movement between said frame and each of said axles and being constructed and arranged to controllably cushion said movement.

2. In the vehicle defined in claim 1, each of said spring assemblies comprising an independently operable torsion spring suspension connected to the end of the adjacent axle.

3. In a vehicle, a laterally rigid frame, spaced front and rear sets of ground engaging dirigible wheels resiliently attached to said frame, an intermediate drive axle supported at opposite ends by wheels beneath opposite sides of the vehicle, and resilient drive axle suspension means permitting controlled cushioned relative lateral movement between said drive axle and the frame.

4. In the vehicle defined in claim 3, the suspension means for said drive axle comprising independent torsion spring assemblies between said frame and opposite ends of said drive axle.

5. In a vehicle, front and rear body sections connected to be laterally rigid but flexible about an intermediate transverse joint, dirigible wheels supporting the front end of the front body section, dirigible wheels supporting the rear end of the rear body section, a drive axle supporting the rear end of said front body section and having drive wheels at opposite ends, means resiliently connecting said front and rear dirigible wheels with said body sections, and independent spring suspensions between each end of said drive axle and said front body section, said spring suspensions permitting cushioned and controlled relative lateral movement between said drive axle and said front body section.

6. In a vehicle, front and rear body sections connected to be laterally rigid but flexible about an intermediate transverse joint, an axle beneath the front end of the front body section, dirigible wheels supporting said axle at opposite ends, a drive axle supporting the rear end of said front body section and having drive wheels at opposite ends, a rear axle supporting the rear end of said rear body section and dirigible wheels supporting opposite ends of said rear axle, means for simultaneously steering all of said dirigible wheels, and independent torsion rod spring suspensions between each end of each axle and its associated body section.

7. In a vehicle having a base frame, a front axle supported by ground engaging dirigible wheels and a drive axle supported by ground engaging drive wheels; and means resiliently connecting said axles to said base frame comprising a plurality of longitudinally disposed torsion rods all grouped at one side of the longitudinal center line of said vehicle.

8. In a vehicle having a base frame, a plurality of sets of ground engaging wheels, and suspensions connecting said sets of wheels to the frame comprising resilient means disposed wholly at one side of the longitudinal center line of said vehicle.

9. In a vehicle having a base frame, spaced axles beneath said frame supported at opposite ends by ground engaging wheels, and suspensions connecting said axles to the frame comprising resilient means disposed wholly at one side of the longitudinal center line of the vehicle and relay mechanism connecting said resilient means with the ends of said axles at the other side of the center line of said vehicle.

10. In a vehicle, a pair of vehicle sections connected to be flexible about a transverse joint but rigid against lateral flexure, an axle supported by dirigible wheels beneath the front end of the front vehicle section, a drive axle beneath the front vehicle section forwardly of said joint, an axle supported at opposite ends by dirigible wheels beneath the rear vehicle section; and means resiliently connecting said axles to the vehicle sections comprising a plurality of torsion rods, the rods springing the axles beneath the front vehicle section all being grouped at one side of the center line of said vehicle.

11. In the vehicle defined in claim 10, a power plant comprising a prime mover and an electrical generator carried by the front vehicle section at the side of the longitudinal vehicle center line opposite said grouped rods, and an electric motor carried by said rear vehicle section and connected to drive said drive axle.

12. In a vehicle, a pair of vehicle sections connected to be flexible about a transverse joint but rigid against lateral flexure, a power plant carried by the front vehicle section at one side of the longitudinal center line of said vehicle, a plurality of pairs of ground engaging wheels, and means resiliently connecting said vehicle sections and said wheels comprising a plurality of longitudinal torsion rods located at the opposite side of the vehicle center line from said power plant and connecting certain pairs of said wheels to the front vehicle section.

13. In a vehicle, a body carrying frame having a pair of main longitudinal members, a front axle supported at opposite ends by dirigible wheels, a rear drive axle, a power plant unit for driving said rear axle supported by said frame at one side of the longitudinal center line of said frame and closely adjacent one of said main longitudinal members, and a plurality of longitudinal torsion rods resiliently connecting opposite ends of said axles to the frame disposed along the longitudinal frame member at the other side of the frame longitudinal center line.

14. In a vehicle, a frame having a pair of main longitudinal members, a front axle supported at opposite ends by dirigible wheels, a rear drive axle supported by wheels at opposite sides of the vehicle, a pair of longitudinal torsion rods each anchored at one end upon one main longitudinal frame member, means connecting the other ends of said rods to the front and rear axles respectively adjacent said one member, a second pair of torsion rods extending along said one member and each anchored at one end to said one member, and means connecting the other ends of said second rods to the front and rear axles respectively adjacent the other main longitudinal frame member.

15. In a vehicle, a pair of main longitudinal frame members, an axle beneath said frame, a torsion rod spring disposed along one of said members and anchored at one end to said one member, and means operatively connecting the other end of said spring to the end of said axle adjacent the other main longitudinal frame member.

16. In a vehicle, a frame having a pair of main longitudinal members, an axle beneath said frame and ground engaging wheels at opposite ends of said axle, a longitudinal torsion rod disposed along one of said members and having one end anchored thereto, means connecting the other end of said rod to the axle at the end adjacent said one member, a second longitudinal torsion rod disposed along said one member and having one end anchored thereto, means flexibly connecting said frame to said axle at the end adjacent the other of said main longitudinal frame members, and a motion transmitting link interconnecting said last-named means to the other end of said second torsion rod.

17. In a vehicle, a frame having a pair of main longitudinal members; a power plant supported by said frame at one side of the longitudinal center line of said vehicle, said member adjacent the power plant having a high level section passing above said power plant; a pair of axles beneath said frame and individual torsion rods operatively connected to each end of each axle extending longitudinally of said frame, said rods being grouped adjacent the member at that side of the vehicle opposite said power plant.

18. In a vehicle, a frame, a transverse axle beneath said frame, a pivotal suspension interconnecting one end of said axle to said frame, a torsion rod extending longitudinally of said frame a substantial distance inwardly of said suspension, means anchoring one end of said torsion rod to said frame and transverse motion transmitting relay mechanism connecting said suspension to the other end of said rod.

19. In a vehicle, a frame, a transverse axle beneath said frame, a pivotal suspension interconnecting one end of said axle to said frame, a torsion rod extending longitudinally of said frame and having one end anchored to said frame, swingable relay arms connected respectively to said suspension and the other end of said rod, and a transverse link interconnecting the lower ends of said arms.

20. In subcombination in a vehicle, a bracket rigid with the vehicle frame, a pair of rotatable anchor blocks on said bracket for supporting ends of a pair of torsion rods, and a torsion rod supporting relay arm swingably carried by said bracket.

21. In a vehicle, a frame, front and rear axles beneath said frame, a bracket rigid with said frame adjacent the front axle, a pair of torsion rod springs operatively connected respectively to opposite ends of said rear axle extending in side by side relation longitudinally of said frame, and means supporting the front ends of both of said rods on said bracket.

22. In a vehicle, front and rear body sections flexible about an intermediate transverse joint but rigid against lateral flexure, drive axles beneath said front and rear body sections and a torsion rod spring independently resiliently connecting each end of each axle to its associated body section.

23. In a vehicle having a body carrying frame, a transverse axle, a system of pivoted levers flexibly connecting one end of said axle to the frame, a relay arm swingably mounted on the frame adjacent said system, a motion transmitting coupling between said system and said arm for converting flexure of said system to swinging movement of said arm, a second relay arm swingably mounted on a transversely spaced part of said frame, a link pivoted at opposite ends to said relay arms so as to transmit swinging movement of said first relay arm to swinging movement of said second relay arm, and a torsion spring controlling swinging movement of said second relay arm.

24. In the vehicle defined in claim 23, said torsion spring comprising an elongated metal torsion rod having one end anchored on the frame and the other end non-rotatably coupled to said second swingable relay arm.

25. In a vehicle, front and rear body sections flexible about an intermediate transverse joint but rigid against lateral flexure, drive axles beneath said front and rear body sections at opposite sides of said joint, and suspensions independently resiliently connecting each end of each said axle to its associated body section, each of said suspensions permitting controlled cushioned relative lateral movement between said drive axles and the frame.

26. In a vehicle having a base frame adapted to support a body, a front axle supporting by ground engaging dirigible wheels and a drive axle supported by ground engaging drive wheels, means for supporting a power plant for said vehicle on said frame adjacent one side edge of said frame; and means resiliently connecting said axles to said frame comprising a plurality of longitudinally disposed torsion rod springs supported on the frame in laterally displaced relation with respect to said power plant, and transverse motion transmitting relay means connecting the end of each axle at the same side of the frame as said power plant to one of said torsion rods.

WILLIAM B. FAGEOL.